(12) United States Patent
Kobayashi et al.

(10) Patent No.: US 8,786,700 B2
(45) Date of Patent: Jul. 22, 2014

(54) POSITION AND ORIENTATION MEASUREMENT APPARATUS, POSITION AND ORIENTATION MEASUREMENT METHOD, AND STORAGE MEDIUM

(75) Inventors: Kazuhiko Kobayashi, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 13/195,478

(22) Filed: Aug. 1, 2011

(65) Prior Publication Data

US 2012/0033071 A1 Feb. 9, 2012

(30) Foreign Application Priority Data

Aug. 6, 2010 (JP) ................................. 2010-178071

(51) Int. Cl.
*G01S 17/89* (2006.01)
(52) U.S. Cl.
USPC .......................................... 348/139; 382/195
(58) Field of Classification Search
CPC ... A24C 5/3412; B61L 23/044; B61L 23/047; B61L 23/048; G01B 11/024
USPC .......................................................... 348/139
See application file for complete search history.

(56) References Cited

U.S. PATENT DOCUMENTS

| | | | |
|---|---|---|---|
| 5,274,360 A | 12/1993 | Watanabe et al. | |
| 6,789,039 B1 | 9/2004 | Krumm | |
| 6,792,370 B2 | 9/2004 | Satoh et al. | |
| 6,993,450 B2 | 1/2006 | Takemoto et al. | |
| 7,092,109 B2 | 8/2006 | Satoh et al. | |
| 7,130,754 B2 | 10/2006 | Satoh et al. | |
| 7,663,649 B2 * | 2/2010 | Takemoto et al. | ............ 345/633 |
| 7,664,341 B2 | 2/2010 | Takemoto et al. | |
| 7,844,105 B2 | 11/2010 | Pfister et al. | |

(Continued)

FOREIGN PATENT DOCUMENTS

| | | |
|---|---|---|
| CN | 101295363 A | 10/2008 |
| CN | 101324433 A | 12/2008 |

(Continued)

OTHER PUBLICATIONS

P.J. Besl et al., "A Method for Registration of 3-D Shapes", IEEE Transactions on Pattern Analysis and Machine Intelligence, vol. 14, No. 2, pp. 239-256 (1992).

(Continued)

*Primary Examiner* — Sath V Perungavoor
*Assistant Examiner* — Howard D Brown, Jr.
(74) *Attorney, Agent, or Firm* — Fitzpatrick, Cella, Harper & Scinto

(57) ABSTRACT

A position and orientation measurement apparatus comprises: a distance information obtaining unit adapted to obtain distance information of a target object captured by a capturing unit; a grayscale image obtaining unit adapted to obtain a grayscale image of the target object; a first position and orientation estimation unit adapted to estimate a position and orientation of the target object based on the information of a three-dimensional shape model and the distance information; a second position and orientation estimation unit adapted to estimate a position and orientation of the target object based on a geometric feature of the grayscale image and projection information obtained by projecting, on the grayscale image, the information of the three-dimensional shape model; and a determination unit adapted to determine whether a parameter of the capturing unit is needed to be calibrated or not, based on both a first and second estimated values.

11 Claims, 3 Drawing Sheets

(56) References Cited

U.S. PATENT DOCUMENTS

| | | |
|---|---|---|
| 7,844,106 B2 | 11/2010 | Pfister et al. |
| 7,848,903 B2 | 12/2010 | Aratani et al. |
| 8,159,598 B2* | 4/2012 | Watanabe et al. ............. 348/345 |
| 8,447,074 B2* | 5/2013 | Nakamura .................... 382/107 |
| 8,600,149 B2* | 12/2013 | Song et al. ................... 382/143 |
| 2006/0066611 A1* | 3/2006 | Fujiwara et al. ............. 345/419 |
| 2008/0089557 A1* | 4/2008 | Iwaki et al. .................. 382/106 |
| 2009/0022365 A1 | 1/2009 | Kotake |
| 2009/0262113 A1 | 10/2009 | Kotake et al. |
| 2010/0142826 A1 | 6/2010 | Kotake et al. |
| 2010/0289797 A1 | 11/2010 | Tateno et al. |
| 2012/0033071 A1* | 2/2012 | Kobayashi et al. ........... 348/139 |
| 2012/0148100 A1* | 6/2012 | Kotake et al. ................ 382/103 |
| 2013/0011018 A1* | 1/2013 | Tateno et al. ................ 382/106 |
| 2013/0076865 A1* | 3/2013 | Tateno et al. ................ 348/46 |

FOREIGN PATENT DOCUMENTS

| | | |
|---|---|---|
| JP | 2806604 B2 | 9/1998 |
| JP | 2003-136465 A | 5/2003 |
| JP | 2009-054759 A | 3/2009 |

OTHER PUBLICATIONS

David G. Lowe, "Fitting Parameterized Three-Dimensional Models to Images", IEEE Transactions on Pattern Analysis and Machine Intelligence, vol. 13, No. 5, pp. 441-450 (May 1991).

Chinese Office Action dated Aug. 19, 2013 in counterpart Chinese Application No. 2011-10225191.8.

* cited by examiner

POSITION AND ORIENTATION MEASUREMENT APPARATUS, POSITION AND ORIENTATION MEASUREMENT METHOD, AND STORAGE MEDIUM

BACKGROUND OF THE INVENTION

1. Field of the Invention

The present invention relates to a position and orientation measurement apparatus, a position and orientation measurement method, and storage medium for measuring the position and orientation of an object whose three-dimensional shape is known.

2. Description of the Related Art

Distance image measurement apparatuses, which irradiate the surface of an object with a pattern of rays of light, hereafter referred to as pattern light; obtain an image using a camera. Such apparatuses determine a correspondence between geometric features by identifying the pattern light reflected by the surface of the object, and measure a depth value with respect to the capturing surface of each pixel using the principle of triangulation. That is, such apparatuses measure a depth value for each pixel of the captured image with respect to the camera using the principle of triangulation.

If the three-dimensional shape model of a measurement object is known, it is possible to estimate a 6-degree-of-freedom parameter of the position and orientation of the shape model so that the difference between the position or distance values of the surface of the model and the screen position or distance value of a geometric feature of an observed image becomes small.

The distance image measurement apparatus calculates distance based on the optical center, the position and orientation of the optical axis, the focal length, and the like of a lens used in an illumination unit configured to irradiate an object with pattern light and a capturing unit configured to capture the pattern. These parameters, therefore, have a large influence on measurement accuracy. It is necessary to calibrate the parameters by capturing a calibration jig several times. A calibration is performed by capturing a jig and comparing features extracted from the captured image with features of the jig.

The illumination unit and capturing unit are fixed to respective supports to perform calibration. While these units are fixed in position, measured values are regarded as correct values. In practical use, the positions of the illumination unit and the capturing unit may shift due to vibrations of the apparatus or loosening of attachments after the calibration processing. Once the units move, it is impossible to calculate a distance image with a high degree of accuracy even if the calibrated parameters are used. It is, therefore, necessary to perform the calibration processing again.

The calibration processing is cumbersome because, for example, a calibration jig is captured several times. It is desired to detect, as an abnormality, a situation in which calibration is needed again, and then perform calibration. Such actions are particularly important when the distance image measurement apparatus is continuously used as a function of a production system.

As a method of detecting a shift of a capturing apparatus, Japanese Patent No. 2806604 discloses a method of detecting an abnormality by setting a given point as a reference and checking the difference between an estimated value of the distance of the given point from the reference point and a distance upon calibration.

Japanese Patent Laid-Open No. 2009-54759 discloses a method of detecting an abnormality of an apparatus based on the difference between recognition results of a plurality of apparatuses.

In distance image measurement, a capturing range is often limited. For example, it is necessary to capture an image so that a measurement object occupies a large portion of a screen. In that case, it may be impossible to set a given point as a reference for detecting an offset of a camera parameter within the capturing range. Even if it is possible to dynamically change the capturing range of the measurement apparatus, a capturing sequence for the reference point is additionally needed. Furthermore, the accuracy of a portion where an index is captured may be different from that of a portion where a measurement object is captured. In this case, an abnormality is detected based on indirect information, thereby decreasing reliability.

The use of the result of another apparatus for detecting an abnormality is viable only when a plurality of apparatuses simultaneously measure the same object. In this case, in order for one or more of the plurality of apparatuses to detect an abnormality of the measurement apparatus it is necessary to cooperate with a number of apparatuses, and the overall system tends to become large. Operation then becomes cumbersome as another mechanism is necessary for maintaining and managing respective pieces of calibrated information.

As described above, since a conventional technique for detecting an abnormality using an index and apparatus other than a distance image measurement apparatus needs to measure the index and apparatus in addition to a measurement object, the above problems associated with convenience arise.

The present invention has been made in consideration of the above problems. The present invention provides a technique for detecting, as an abnormality, a change in parameters of a capturing apparatus after calibration without the need for another index for check and another apparatus, by detecting, from image information of a distance image and that of a grayscale image, an abnormality using a model of a target object based on a difference between estimated values obtained by two position and orientation estimation processes.

SUMMARY OF THE INVENTION

According to a first aspect of the present invention, there is provided a position and orientation measurement apparatus comprising: a storage unit adapted to store information of a three-dimensional shape model of a target object; a distance information obtaining unit adapted to obtain distance information of the target object captured by a capturing unit; a grayscale image obtaining unit adapted to obtain a grayscale image of the target object captured by the capturing unit; a first position and orientation estimation unit adapted to estimate a first estimated value representative of the position and orientation of the target object based on the information of the three-dimensional shape model stored in the storage unit and the distance information; a second position and orientation estimation unit adapted to estimate a second estimated value representative of the position and orientation of the target object based on a geometric feature of the grayscale image and projection information obtained by projecting, on the grayscale image, the information of the three-dimensional shape model stored in the storage unit; and a determination unit adapted to determine whether a parameter of the capturing unit is needed to be calibrated or not, based on both the first estimated value estimated by the first position and orientation estimation unit and the second estimated value estimated by the second position and orientation estimation unit.

According to a second aspect of the present invention, there is provided a position and orientation measurement method comprising: a storage step of storing information of a three-dimensional shape model of a target object; a distance information obtaining step of obtaining distance information of the target object captured by a capturing unit in a capturing step; a grayscale image obtaining step of obtaining a grayscale image of the target object captured in the capturing step; a first position and orientation estimation step of estimating a first estimated value representative of the position and orientation of the target object based on the information of the three-dimensional model stored in the storage step and the distance information; a second position and orientation estimation step of estimating a second estimated value representative of the position and orientation of the target object based on a geometric feature of the grayscale image and projection information obtained by projecting, on the grayscale image, the information of the three-dimensional shape model stored in the storage step; and a determination step of determining whether calibration of a parameter of the capturing unit is necessary or not, based on both the first estimated value estimated in the first position and orientation estimation step and the second estimated value estimated in the second position and orientation estimation step.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1A:
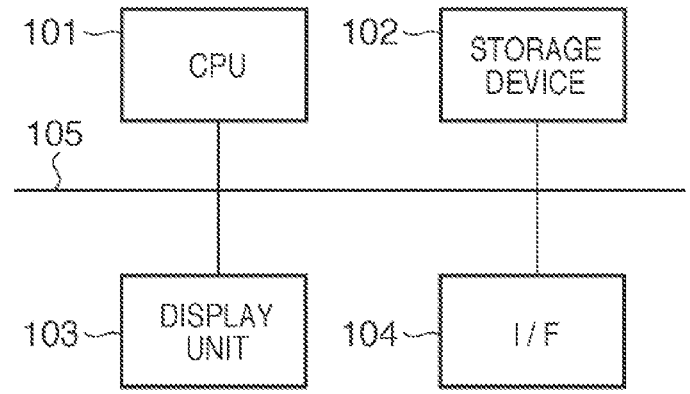
FIG. 1A is a block diagram showing the hardware configuration of a position and orientation measurement apparatus.

The hardware configuration of a position and orientation measurement apparatus according to the first embodiment will be described with reference to FIG. 1A.

A CPU 101 controls each processing unit (to be described later). A storage device 102 includes a RAM and ROM, and stores various data. A display unit 103 serves as a display so as to display various data as necessary to perform the invention. An I/F 104 is an interface. The user instructs an operation of the position and orientation measurement apparatus via the interface. A bus 105 interconnects the above CPU 101, storage device 102, display unit 103, and I/F 104.

Figure 1B:
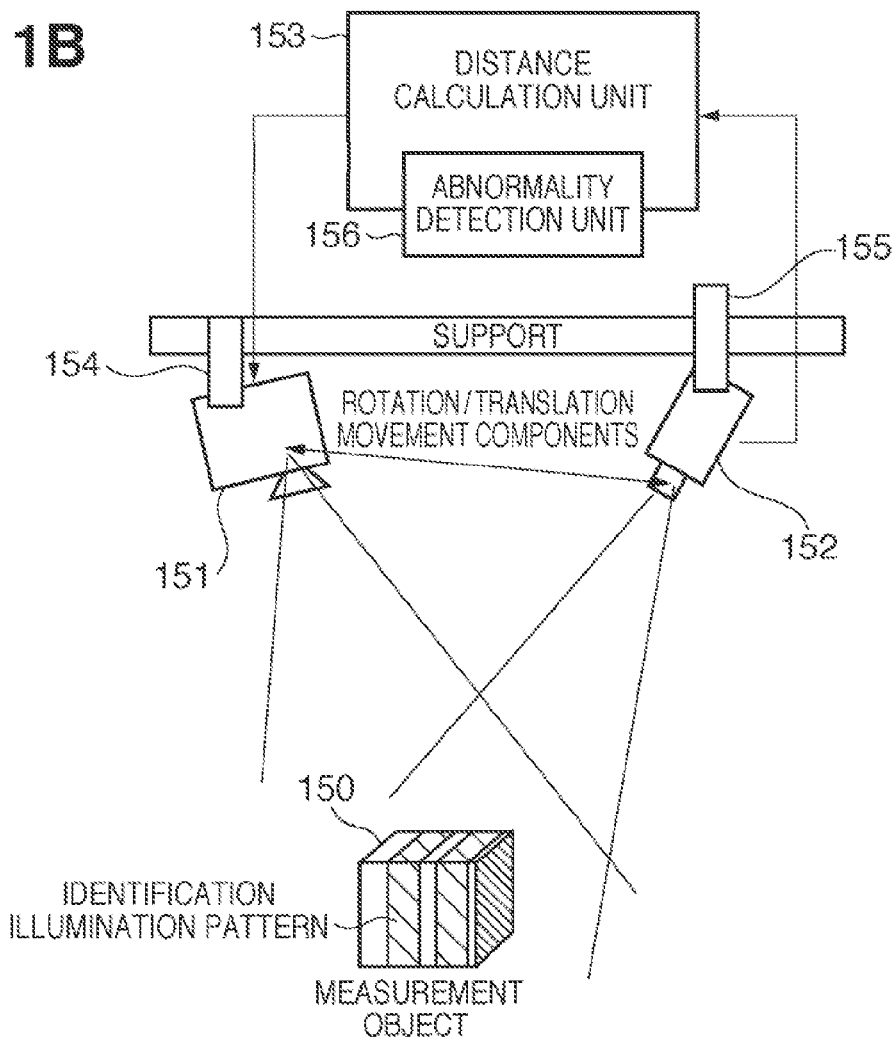
FIG. 1B is a schematic view showing the position and orientation measurement apparatus.

The arrangement of the position and orientation measurement apparatus according to this embodiment will be explained next with reference to FIG. 1B. A pattern light illumination unit 151 illuminates a measurement object 150 with controlled pattern light. A capturing unit 152 captures light reflected by the measurement object 150. An illumination support 154 and a capturing support 155 respectively fix the pattern light illumination unit 151 and the capturing unit 152 so that the positional relationship between them is fixed. From images of the pattern light which has been output by the pattern light illumination unit 151 and captured by the capturing unit 152, a distance calculation unit 153 calculates the distance value for each image by performing pattern recognition.

An abnormality detection unit 156 detects, as an abnormality, a change in parameters associated with the pattern light illumination unit 151 and capturing unit 152 after calibrating the capturing conditions of the capturing apparatus.

Next, the parameters in the pattern light illumination unit 151 and capturing unit 152 which are necessary for calculating distance will be described. The parameters can include intrinsic parameters and extrinsic parameters. The intrinsic parameters are associated with the design values of an optical system, and include a focal length, lens distortion, or principal point position. The extrinsic parameters indicate a relative positional relationship between the pattern light illumination unit 151 and the capturing unit 152, which can be represented by six parameters of rotation/movement components.

It is possible to estimate these parameters by capturing, several times, a calibration pattern whose shape is known (camera calibration technology). In this embodiment, since a calibrated value is compared with the state of an apparatus, any method may be used as a calibration method. Assume that the parameters have been calibrated using some calibration method.

In calibrating the parameters, assume that the pattern light illumination unit 151 and the capturing unit 152 are fixed. If the position of the apparatus or setting of a lens changes from a fixed state, calibration is needed again. There are various factors that change the position of the apparatus or setting of the lens, such as the stiffness of a fixing jig, vibrations of another apparatus, or wear of a fixing unit due to age. Since even a minor change in positional relationship with respect to a calibrated state affects a measured value in distance capturing, calibration is needed again.

The timing when a factor that changes the parameters associated with the pattern light illumination unit 151 and the capturing unit 152 occurs is uncertain. In general, calibration processing may be performed immediately before using the apparatus. However, since capturing a calibration index is cumbersome, calibration processing may be performed only when an abnormality is detected.

Figure 2:
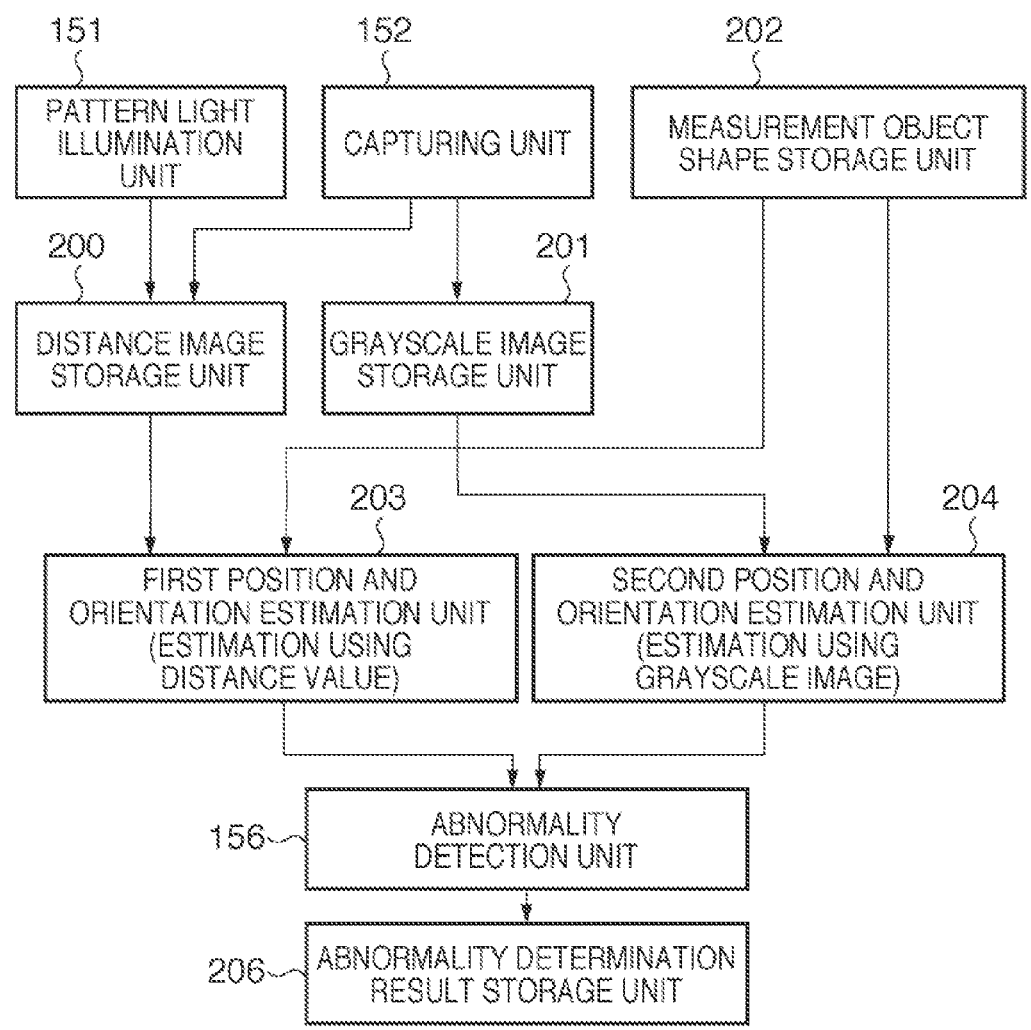
FIG. 2 is a block diagram for explaining each processing unit associated with the position and orientation measurement apparatus.

The arrangement of each processing unit according to this embodiment will be explained with reference to FIG. 2. The pattern light illumination unit 151 illuminates a measurement object with pattern light. The capturing unit 152 captures the reflected image. It is possible to implement an actual illumination step using a liquid crystal projector and an apparatus for generating a pattern. As the capturing unit 152, an electronic camera including a CMOS or CCD for converting the light into a charge amount can be used. In this distance image measurement processing, assume that it is possible to capture a grayscale image using reflection of ambient light by an object surface in addition to the pattern light for distance capturing. Generally, simultaneously with obtaining distance information, many apparatuses can obtain a grayscale image for the purpose of giving the texture of the object surface, which cannot be represented by the distance information, to a distance image indicating the distance information. In this example, assume that the same image sensor is used for pattern capturing for a distance image and grayscale image capturing in the capturing unit 152.

A distance image storage unit 200 stores the distance image measured in the distance image measurement processing. A grayscale image storage unit 201 stores the grayscale image. These images are information storing a measured value for each discrete unit space forming a grid pattern. The distance image stores a distance value from the optical center of the capturing unit 152. On the other hand, the grayscale image stores a reflection luminance value. It is possible to readily store these pieces of information by recording them on the storage device 102 including a memory element such as a RAM, or a file. As long as the distance value from the optical center can be stored, it is unnecessary to store the distance value in the form of a distance image.

A measurement object shape storage unit 202 stores geometric information on an object contained in a captured image. More specifically, it is possible to use any one of various representation methods such as a polygon mesh for representing an object shape, a representation method using a BRep format used in CAD, and a method using a point cloud and distance field. Furthermore, if a design drawing or a part manufactured based on a CAD model is a target, its design information can be used. Instead of the design information of the measurement object 150, the result of merging a measurement point cloud of the measurement object 150 obtained in distance image measurement processing may be used as one three-dimensional shape model. In this example, the position and orientation parameter of a three-dimensional shape model corresponding to the measurement object 150 need only be compared with measurement information.

Using information of the distance image storage unit 200 or that of the grayscale image storage unit 201, and that of the measurement object shape storage unit 202, two position and orientation estimation processes are performed for a shape model.

A first position and orientation estimation unit 203 estimates the position and orientation of a model so that the difference between a point cloud transformed based on a distance value, which has been obtained by measurement processing, in the depth direction of the surface of the measurement object 150 and the object surface obtained from the measurement object shape storage unit 202 becomes small. As a practical method, it is possible to estimate the position and orientation using the ICP (Iterative Closest Point) algorithm proposed by Besl, P. J. et al. (see "A method for Registration of 3-D shapes", IEEE Transactions on Pattern Analysis and Machine Intelligence, Vol. 14, No. 2, pp. 239-256. 1992). This is a method of sequentially calculating a rigid-body transform of a model such that a spatial distance when associating a model surface with a point cloud in a distance image becomes small, using a nearest-neighbor correspondence between the model surface and the point cloud. The first position and orientation estimation unit 203 uses a distance image and a model of the measurement object 150 but does not use a grayscale image.

A second position and orientation estimation unit 204 obtains a correspondence between a geometric feature contained in a grayscale image and that associated with the appearance of the model obtained from the measurement object shape storage unit 202. Using a coordinate value on the surface of the grayscale image in the correspondence, the position and orientation of the measurement object 150 is estimated. More specifically, it is possible to estimate the position and orientation of the target object based on a geometric feature contained in projection information obtained by projecting information of the three-dimensional shape model on the grayscale image and a geometric feature of the grayscale image. A position where the geometric feature of the target object in a three-dimensional space is projected on a capturing screen (the surface of the grayscale image) can be correctly calculated using parameters of an optical system. More specifically, it is possible to use a position and orientation estimation method using a model from a grayscale image as disclosed in a method proposed by David G. Lowe (see "Fitting parameterized three-dimensional model to images", IEEE Transactions on Pattern Analysis and Machine Intelligence, 13, 5 (May 1991), pp. 441-450).

The second position and orientation estimation unit 204 uses an edge generated due to a change in density gradient as a geometric feature which is detectable even if there is no specific texture on the surface of the measurement object 150. This edge is robust against an illumination variation but its correspondence is indeterminate. Therefore, using a nearest-neighbor correspondence between an actually observed edge and a coordinate value on the capturing screen projection-transformed using the position and orientation parameter for estimating a model shape, the position and orientation is updated so that the error on that screen becomes small. The second position and orientation estimation unit 204 uses a grayscale image and a model of the measurement object 150 but does not use a distance image.

If there is no abnormality, the estimated value of the first position and orientation estimation unit 203 in position and orientation estimation processing should be the same as that of the second position and orientation estimation unit 204 in position and orientation estimation processing. The abnormality detection unit 156 detects an abnormality if the two values are compared and then there is a difference between the two values. The first position and orientation estimation unit 203 uses information of a distance value calculated using the parameters associated with the pattern light illumination unit 151 and capturing unit 152. On the other hand, the second position and orientation estimation unit 204 uses information of a model projection position calculated using the parameters associated with the capturing unit 152. As described above, the first position and orientation estimation unit 203 and second position and orientation estimation unit 204 use the information in the distance image measurement processing in a different manner. If, therefore, a position and orientation estimation result of the first position and orientation estimation unit 203 is different from that of the second position and orientation estimation unit 204, some of the parameters can be determined to be different from each other.

For the position and orientation parameter, it is possible to use position information with respect to the x, y, and z axes of a certain coordinate system as a parameter associated with a position. It is possible to represent, as a parameter associated with rotation, an orientation by three components associated with rotation. The abnormality detection unit 156 calculates the inner product of the parameters. The unit 156 can use the fact that if the parameters exactly coincide with each other, the inner product becomes the norm-square. Assume that an appropriate accuracy range is given in advance, since required measurement accuracy generally depends on a measurement object or a measurement environment. A tolerance of the inner product value of the parameters is determined based on the accuracy range. When the inner product falls outside the tolerance, it is determined that there is a difference between the position and orientation estimated value of the first position and orientation estimation unit 203 and that of the second position and orientation estimation unit 204 larger than a threshold, thereby detecting an abnormal state.

In this embodiment, an inner product is used as a method for comparing parameters. The absolute value of a difference for each parameter component, or the sum or weighted sum of square values may be used. In this case, if the sum is larger than a threshold, an abnormal state is detected. In fact, parameters to be compared may be limited, for example, when movement of the measurement object 150 is limited to that on a flat surface, or when movement of the measurement object 150 is limited to axial rotation. Any comparison method suitable for a measurement environment is used.

An abnormality determination result storage unit 206 stores an abnormality detection result. In fact, the abnormality detection unit 156 sets a flag indicating whether a value is equal to or smaller than the threshold. The unit 206 may also store the comparison target value. These pieces of information are useful as information data used for succeeding processing.

The abnormality determination result storage unit 206 stores information indicating that the pattern light illumination unit 151 and capturing unit 152 are in a state different from a calibrated state. The unit 206 may store, as a non-abnormal state, that those units are in a normal state, as a matter of course. By notifying, through the display unit 103, a result that an abnormal state has been determined, the user can start taking measures based on the result. As a notification method, a warning light may be flickered, or an alert may be sounded. Furthermore, the user of a communication terminal apparatus may be notified using a network.

Figure 3:
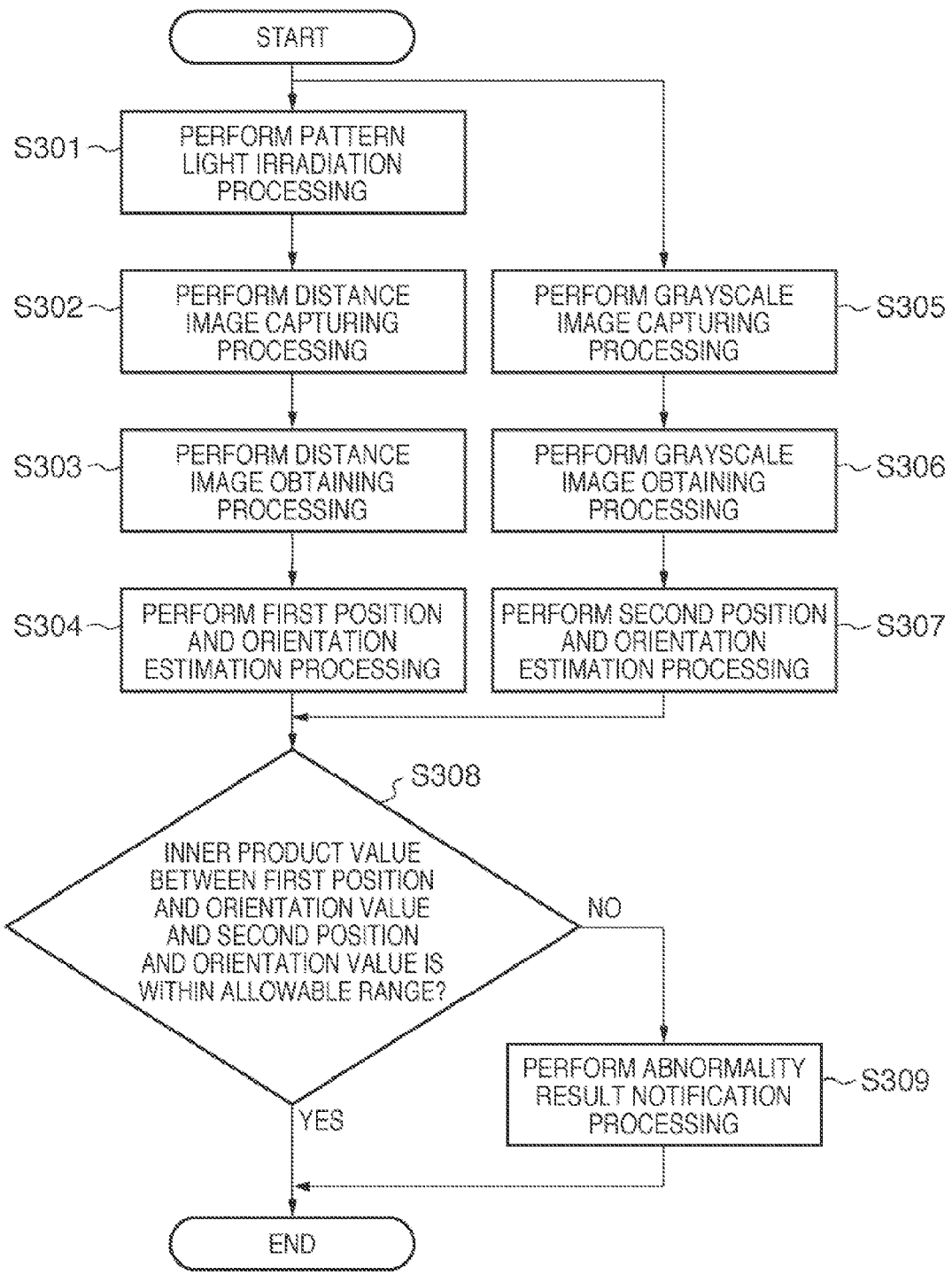
FIG. 3 is a flowchart illustrating a processing sequence.

A flowchart illustrating a practical processing sequence using each processing unit described above will be explained with reference to FIG. 3.

In step S301, the pattern light illumination unit 151 irradiates the measurement object 150 with pattern light. In step S302, the capturing unit 152 captures light reflected from the measurement object 150. In step S303, the distance image storage unit 200 executes distance image obtaining processing for the measurement object 150.

In step S304, the capturing unit 152 captures a grayscale image of the measurement object 150. In step S305, the grayscale image storage unit 201 performs grayscale image obtaining processing for the measurement object 150. In step S306, the first position and orientation estimation unit 203 estimates the first position and orientation based on the shape information of the measurement object 150 stored in the measurement object shape storage unit 202 and a distance image obtained in step S303 (the first estimated value). In step S307, the second position and orientation estimation unit 204 estimates the second position and orientation based on the shape information of the measurement object 150 stored in the measurement object shape storage unit 202 and the grayscale image obtained in step S304 (the second estimated value). In step S308, the abnormality detection unit 156 compares the first position and orientation value with the second position and orientation value to detect whether or not there is an abnormality. More specifically, as described above, the inner product value between the values is calculated to determine whether it is within an allowable range. If the inner product value is not within an allowable range (NO in step S308), it is determined that there is an abnormality, and the user is notified of the abnormality in step S309; otherwise (YES in step S308), it is determined that there is no abnormality, and the process ends. Note that the user may be notified of a normal state. Then, the process ends.

According to this embodiment, it is possible to detect as an abnormality, a change after calibration without the need for another index for checking and another apparatus, by detecting, from image information of a distance image and that of a grayscale image, an abnormality using a model of a target object based on the estimated values obtained by two position and orientation estimation processes.

(Second Embodiment)

It is possible to avoid a failure due to poor measurement by using the abnormality detection method according to the above embodiment in a distance image measurement apparatus or the like, and then enabling the apparatus to use an abnormality detection result as control information for a driving unit. Another embodiment of the present invention is also useful for a system which uses a robot hand as a driving unit, and includes a target object position and orientation measurement apparatus having a device implementing the abnormality detection method according to the above embodiment. In the target object position and orientation measurement apparatus attached to a robot hand unit, a shift of an illumination unit and capturing unit may occur due to vibrations of a motor or contact with other parts. By using the abnormality detection method according to the present invention, it is possible to detect a change of the illumination unit and capturing unit after calibration without using another index for checking and another apparatus. In order to detect an abnormality, each state detected by the abnormality detection unit 156 in FIG. 2 is checked repeatedly, and if an abnormal state is detected, the apparatus is stopped. Stopping the apparatus avoids a failure due to poor measurement thereafter. If calibration processing is registered as a sequence, it is possible to call the sequence to perform the calibration processing. This can reduce the workload for calibration, thereby improving the convenience of the system.

According to the present invention, it is possible to detect as an abnormality, a change in the capturing conditions of a capturing apparatus after calibration without the need for another index for checking and another apparatus, by detecting, from information of a distance image and that of a grayscale image, an abnormality using a model of a target object based on the difference between estimated values obtained by two position and orientation estimation processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-178071 filed on Aug. 6, 2010, which is hereby incorporated by reference herein in its entirety.

What is claimed is:

1. A position and orientation measurement apparatus comprising:
 a storage unit configured to store information of a three-dimensional shape model of a target object;
 a distance information obtaining unit configured to obtain distance information of the target object captured by a capturing unit;
 an image obtaining unit configured to obtain a two-dimensional image of the target object captured by the capturing unit;
 a first position and orientation estimation unit configured to estimate a first estimated value representative of the position and orientation of the target object based on the information of the three-dimensional shape model stored in said storage unit and the distance information;
 a second position and orientation estimation unit configured to estimate a second estimated value representative of the position and orientation of the target object based on a geometric feature of the two-dimensional image and projection information obtained by projecting, on the two-dimensional image, the information of the three-dimensional shape model stored in said storage unit; and a determination unit configured to determine whether a parameter of the capturing unit needs to be calibrated, based on both the first estimated value estimated by said first position and orientation estimation unit and the second estimated value estimated by said second position and orientation estimation unit.

2. The apparatus according to claim 1, further comprising a notification unit configured to notify, if said determination unit determines that the parameter of the capturing unit is needed to be calibrated, the fact that the capturing unit needs to calibrate the parameter.

3. The apparatus according to claim 1, wherein said determination unit calculates an inner product value between the first estimated value and the second estimated value and determines that the parameter of the capturing unit is needed to be calibrated, if the inner product value is not within an allowable range.

4. A position and orientation measurement method comprising:
- a storage step of storing information of a three-dimensional shape model of a target object;
- a distance information obtaining step of obtaining distance information of the target object captured by a capturing unit in a capturing step;
- an image obtaining step of obtaining a two-dimensional image of the target object captured in the capturing step;
- a first position and orientation estimation step of estimating a first estimated value representative of the position and orientation of the target object based on the information of the three-dimensional model stored in the storage step and the distance information;
- a second position and orientation estimation step of estimating a second estimated value representative of the position and orientation of the target object based on a geometric feature of the two-dimensional image and projection information obtained by projecting, on the two-dimensional image, the information of the three-dimensional shape model stored in the storage step; and
- a determination step of determining whether calibration of a parameter of the capturing unit is necessary or not, based on both the first estimated value estimated in the first position and orientation estimation step and the second estimated value estimated in the second position and orientation estimation step.

5. The method according to claim 4, wherein said determination step includes the calculation of an inner product value between the first estimated value and the second estimated value and the determination that a parameter of the capturing unit is needed to be calibrated, if the inner product value is not within an allowable range.

6. A non-transitory computer-readable storage medium storing a computer program which causes a computer to execute the position and orientation measurement method according to claim 4.

7. The apparatus according to claim 1, wherein said determination unit calculates a difference value between the first estimated value and the second estimated value and determines that the parameter of the capturing unit is needed to be calibrated, if the difference value is not within an allowable range.

8. The apparatus according to claim 1, wherein the stored information of the three-dimensional shape model of a target object is CAD model information.

9. The apparatus according to claim 1, wherein the two-dimensional image is a grayscale image.

10. The apparatus according to claim 1, wherein the distance information is obtained from a range image.

11. The apparatus according to claim 1, wherein the stored information of the three-dimensional shape model of a target object is polygon mesh information for representing the object.

* * * * *